United States Patent

[11] 3,563,503

| [72] | Inventor | Charles C. Lancaster |
| | | 6140 Grape, Houston, Tex. 77036 |
| [21] | Appl. No. | 780,021 |
| [22] | Filed | Nov. 29, 1968 |
| [45] | Patented | Feb. 16, 1971 |

[54] PIPE INSULATION SUPPORT
5 Claims, 3 Drawing Figs.

[52] U.S. Cl............................................. 248/49;
138/106
[51] Int. Cl............................................. F16l 3/02
[50] Field of Search........................... 248/49, 58,
62; 138/107, 106, 149, 141

[56] References Cited
UNITED STATES PATENTS

| 2,891,749 | 6/1959 | Heverly | 248/49 |
| 3,000,433 | 9/1961 | Kemper | 138/147 |
| 3,122,346 | 2/1964 | Seiler | 248/62 |
| 3,185,758 | 5/1965 | Litz | 248/62 |
| 3,244,388 | 4/1966 | Coffman | 248/62 |
| 3,336,951 | 8/1967 | Huelster | 138/141X |
| 2,857,931 | 10/1958 | Lawton | 138/149X |

*Primary Examiner*—Chancellor E. Harris
*Attorneys*—James F. Weiler, Jefferson D. Giller, William A. Stout, Paul L. Deverter II, Dudley R. Dobie Jr. and Henry W. Hope ABSTRACT: An insulating support for supporting and protecting a pipe from ambient temperatures having a high density polyurethane insulation member which is semicircular in cross section and adapted to be positioned under the bottom of the pipe and which is bonded to a metal load-bearing semicircular member which is adapted to be supported from a support member, and a second insulation member being semicircular in cross section and adapted to be positioned over the top of the pipe and coact with the first member to insulate the pipe. The first member having a density of at least 7 pounds per cubic foot. The second member being polyurethane having a density of approximately 2 pounds per cubic foot. A vapor cover surrounding and bonded to the first and second members and the load bearing member.

PATENTED FEB 16 1971

3,563,503

Charles C. Lancaster
INVENTOR.

BY James F. Weiler
William G. Hunt

ATTORNEYS

PIPE INSULATION SUPPORT

BACKGROUND OF THE INVENTION

Generally, pipes are insulated by insulating material such as conventional polyurethane having a 2 pound density per cubic foot or other conventional materials. However, these materials are structurally weak and pipe straps or other supports cannot normally be used directly on the insulation, and it is common to utilize a metal support placed around the bottom of the insulator upon which the insulator and the pipe rest. However, the metal support will tend to deform away from the insulation and concentrate the load at the point of support thereby cracking or compressing the insulation and breaking any vapor barrier surrounding the insulation.

SUMMARY

The present invention is directed to providing a high density polyurethane bonded to a metal load-bearing member and which therefore act together as a beam to support the pipe and distribute the load, and provide a quicker and cheaper method of installation of the insulation.

A further object of the present invention is the provision of an insulation support for a pipe having a first polyurethane insulation member adapted to be positioned at the bottom of the pipe and having a density in the range of 7 to 30 pounds per cubic foot and bonded to a metal load bearing member to form a high load-bearing beam for the pipe, and a second insulating member positioned over the top of the pipe and coacting with the first member to enclose the pipe, and a vapor barrier cover surrounding and bonded to the first and second members in the load-bearing member.

DESCRIPTION OF THE PREFERRED EMBODIMENT

Figure 2:
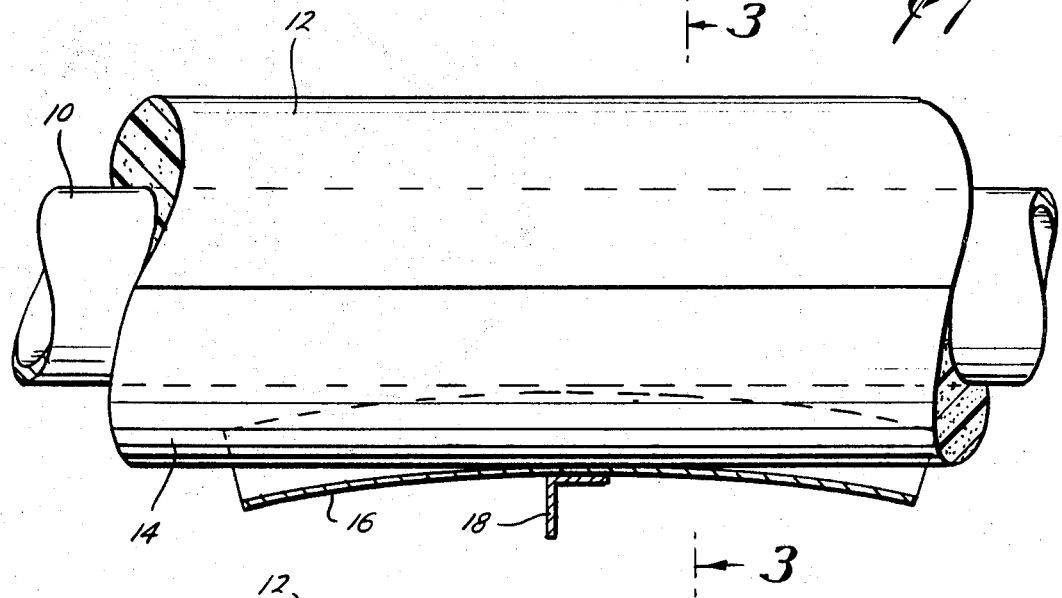
FIG. 2 is an elevational view, partly in cross section, illustrating the prior art.
Figure 3:
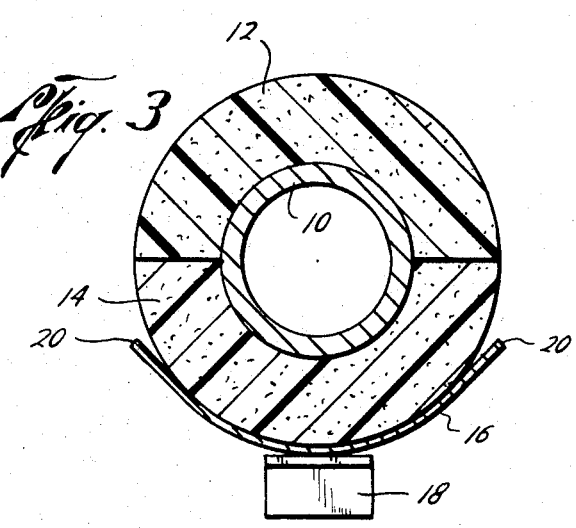
FIG. 3 is a cross-sectional view taken along the line 3–3 of FIG. 2.

Generally, and referring to FIGS. 2 and 3, a pipe 10 such as a line carrying either hot or cold fluid is insulated by enclosing it within two semicircular insulated segments 12 and 14 such as conventional polyurethane having a 2 pound density per cubic foot or other conventional insulating material. However, conventional materials such as polyurethane are weak or brittle and thereof therefore pie supports such as straps, angle iron or other supports cannot normally be connected directly on the insulation and therefore a metal support 16 is set in place beneath the lower insulator 14 and against a support such as angle iron 18. However, as noted in FIG. 2, because of the load is concentrated by the angle iron support 18 at one locality of on the metal support 16, the support 16 will tend to deform away from the insulation and thus will not spread the load evenly, but will concentrate it over the support 18 and crack the insulator segment 14.

In addition, and referring to FIG. 3, the metal support 16 will also deform in a transverse cross section, as well as longitudinally, causing the edges 20 to spread away from the insulator 14 again concentrating the load on the insulation 14 and the spreading edges 20 would break any vapor barrier over cover that would be installed surrounding the entire insulation.

Figure 1:
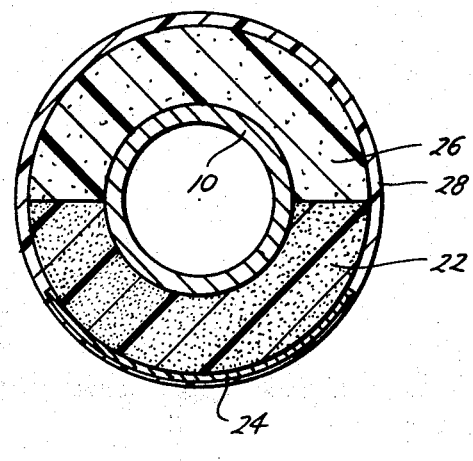
FIG. 1 is a cross-sectional view of the apparatus of the present invention.

The present invention, as best seen in FIG. 1, overcomes the problems noted in the prior art by providing a first foamed plastic insulation member 22 having a density of at least 7 pounds per cubic foot and preferably being polyurethane having a density in the range of 7 to 30 pounds per cubic foot to provide a structural member having a strength ranging from approximately 125 to 2,000 pounds per square inch instead of the relatively weak low density conventional materials previously used. In addition, the high density polyurethane is a good insulator having a low thermal conducting factor to prevent condensation or excessive heat loss (K = approximately 0.17 is for 7 pound density polyurethane). The member 22 is semicircular in cross section and adapted to be positioned under the bottom of the pipe for support and insulation.

In addition, it is important that the first member 22 be bonded to the metal load-bearing member 24 over the entire contact surface between members 22 and 24. Thus, the members 22 and 24 will act as a beam and fill fly fully distribute the load of the support over a greater area, and on a stronger structure and will prevent concentration and cracking of the insulation 22.

A second for foamed plastic insulation member 26, being semicircular in cross section is provided and adapted to be positioned over the top of the pipe 10 to coact with the first insulation member 22 to enclose and insulate the pipe. Since the strength provided by support 22 is only required on the bottom of the pipe 10, there is no need to use the more expensive high density polyurethane as the second member 26, but any suitable conventional insulation material such as low density polyurethane may be used for member 26.

In addition, a suitable vapor barrier cover 28 may be provided to surround and be bonded to the insulation members 26 and 22 and to the metal load-bearing member 24 such as mastics, paper or any suitable cover to further insulate the installation and the joints between the insulators 22 and 26.

The present invention, will, therefore, provide a stronger structure and the bonded metal load-bearing member 24 will not deform away from the insulation 22 to break the vapor barrier cover 28 or concentrate the load at a support location to crack the insulation 22, but will fully distribute the load over the length of the load-bearing metal support 24. In addition, the fact that the metal backing 24 is bonded to the member 22 allows a quicker and cheaper method of installing insulation about the pipe 10.

The present invention is, therefore, well adapted and suited to attain the objects and has the advantages and features mentioned as well as others inherent therein. While a presently preferred embodiment of the invention has been given for the purpose of disclosure, numerous changes in the detail of construction and arrangement of parts may be made.

I claim:

1. An insulation support for supporting and protecting a pipe from ambient temperatures comprising:

a first foamed plastic rigid load-bearing insulation member, said member being semicircular in cross section and adapted to be positioned under the bottom of the pipe and having a density of at least 7 pounds per cubic foot, a metal load-bearing member being arcuate in cross section and positioned against the bottom of the first plastic insulation member and bonded to the first member along the contacting surfaces between the metal member and the first member and spaced from the pipe and adapted to be supported from a pipe support, the length of the metal member being longer than the width of the pipe support; and a second foamed plastic insulation member, said second member being semicircular in cross section and adapted to be positioned over the top of the pipe and coact with the first member to enclose the pipe, said second member being of a less expensive material than the first member.

2. The apparatus of claim 1 including a vapor barrier cover surrounding and bonded to the first and second members and the load-bearing member.

3. The apparatus of claim 1 wherein the first and second members are polyurethane.

4. The apparatus of claim 3 wherein the second member has a density of approximately 2 pounds per cubic foot.

5. The apparatus of claim 1 wherein the first member is polyurethane and a density of in the range of 7 to 30 pounds per cubic foot.